US011861876B2

(12) United States Patent
Lee et al.

(10) Patent No.: US 11,861,876 B2
(45) Date of Patent: Jan. 2, 2024

(54) METHOD FOR GENERATING VIDEO FILE FORMAT-BASED SHAPE RECOGNITION LIST

(71) Applicant: Marvel Research Limited, Fo Tan (HK)

(72) Inventors: Ying Chiu Herbert Lee, Shatin (HK); Chang Yuen Chan, Shatin (HK)

(73) Assignee: Marvel Research Limited, Fo Tan (HK)

( * ) Notice: Subject to any disclaimer, the term of this patent is extended or adjusted under 35 U.S.C. 154(b) by 0 days.

(21) Appl. No.: 17/602,697

(22) PCT Filed: Mar. 13, 2020

(86) PCT No.: PCT/CN2020/079093
§ 371 (c)(1),
(2) Date: Oct. 8, 2021

(87) PCT Pub. No.: WO2020/207186
PCT Pub. Date: Oct. 15, 2020

(65) Prior Publication Data
US 2022/0230411 A1    Jul. 21, 2022

(30) Foreign Application Priority Data

Apr. 8, 2019 (CN) .......................... 201910276395.0

(51) Int. Cl.
*G06V 10/20* (2022.01)
*G06V 10/762* (2022.01)
(Continued)

(52) U.S. Cl.
CPC ...... *G06V 10/255* (2022.01); *G06F 18/23213* (2023.01); *G06F 18/2411* (2023.01); *G06V 10/761* (2022.01); *G06V 10/7625* (2022.01)

(58) Field of Classification Search
CPC .............. G06V 10/255; G06V 10/761; G06V 10/7625; G06F 18/2411; G06F 18/23213
See application file for complete search history.

(56) References Cited

U.S. PATENT DOCUMENTS 6,956,573 B1   10/2005  Bergen et al.
2015/0254857 A1*  9/2015  Huang .................. G06T 19/006
                                              382/154
2017/0200313 A1*  7/2017  Lee ...................... H04N 9/3147

FOREIGN PATENT DOCUMENTS

CN    107852458 A    3/2018
CN    108965929 A   12/2018
CN    110008904 A    7/2019

* cited by examiner

*Primary Examiner* — David F Dunphy
(74) *Attorney, Agent, or Firm* — Duane Morris LLP

(57) ABSTRACT

A three-dimensional (3D) video reconstruction method, an encoder and a decoder are provided, comprising obtaining a list of video content screens or video content frames of an object from the 3D video; obtaining a list of depth screens of the 3D video; adding a shape screen to each video frame of the 3D video; superimposing each of the video content screens or video content frames with the depth screen and the shape screen to form a shape identification library; and storing the shape identification library at a header of a compressed file for unmasking of the object. The shape recognition list format may significantly reduce the storage size and increase the compression ratio by replacing the original shape with the identifications, and help improve the rendering quality.

18 Claims, 4 Drawing Sheets

(51) Int. Cl.
*G06V 10/74* (2022.01)
*G06K 9/62* (2022.01)
*G06F 18/2411* (2023.01)
*G06F 18/23213* (2023.01)

(1)      (2)      (3)      (4)      (5)      (6)

(1,-1,1)    (-1,0,1)    (-1,1,1)    (0,0,1)    (0,0,1)    (0,-1,1)

(-1,-1,1) (0,0,1) (1,0,1) (1,0,1) (0,0,1) (1,-1,1) (1,-1 1) (1,-1,1)

METHOD FOR GENERATING VIDEO FILE FORMAT-BASED SHAPE RECOGNITION LIST

CROSS-REFERENCE TO RELATED APPLICATIONS & TECHNICAL FIELD

This U.S. national stage application is based on PCT International Application No. PCT/CN2020/079093, filed Mar. 13, 2020, which claims the benefit and priority in and to Chinese Patent Application No. 201910276395.0, filed Apr. 8, 2019, both of which are incorporated in their entirety herein by reference. The present invention relates to a method for generating a video file format-based shape recognition list, in particular to a method for generating a shape recognition list based on video file format for storing and compressing a stereoscopic or light field video.

TECHNICAL FIELD

The present invention relates to a method for generating a video file format-based shape recognition list, in particular to a method for generating a shape recognition list based on video file format for storing and compressing a stereoscopic or light field video.

BACKGROUND

At present, most visual contents are still two-dimensional images or videos present in the form of image sequences. With the development of display technology, stereoscopic or three-dimensional (3D) displays with active shutters or passive polarized glasses are now widely available. The inputs of three-dimensional displays usually have the following forms: (1) a video content or video texture and a depth map describing a depth of each pixel in the video content (i.e., 2D+Z format); and (2) a set of videos proximate to a viewpoint multiplexed on one image frame in a certain format, the set of videos proximate to the viewpoint sometimes being referred to as multi-view video. The reconstruction quality of the multi-view based on the traditional 2D+Z format is highly dependent on the quality of the depth map. When the depth map and the video texture are compressed, distortion errors may accumulate in the two files, and this may introduce artifacts due to misalignment of depth discontinuities (for example, different boundaries of different objects). In prior art, there is an artifact-aware view synthesis system. The system employs shape information to improve the reconstruction quality of the multiple views. However, it mainly processes the compression of the shape by exploring the redundancy of the shape and directly compressing the shape.

A new method is needed to improve the 2D+Z format-based stereoscopic video by improving the reconstruction quality of the video of the traditional 2D+Z format.

SUMMARY

The present invention provides a method for generating a video file format-based shape recognition list, comprising: obtaining a list of video content screens or video content frames of an object from the 3D video; obtaining a list of depth screens of the 3D video; adding a shape screen to each video frame of the 3D video; superimposing each of the video content screens or video content frames with the depth screen and the shape screen to form a shape identification library; and storing the shape identification library at a header of a compressed file for unmasking of the object; wherein, the shape screen is a shape information identification, which comprises a classification identification, an object recognition identification, and a direction vector of the video content screen or the video content frame; wherein the shape information identification further comprises a time identification and a coordinate identification; wherein the shape information identification is represented by the following 20-bit bytes:

CCNNNNVVVTTTTTTTTXYZ  (1);

Wherein, CC represents a classification identification, which is used for distinguishing one object from other objects; NNNN is an object recognition identification, wherein the same object recognition identification represents that two objects are the same object; VVV is a direction vector, wherein each byte is represented by 1, 0, or −1, representing a direction of the object, respectively; TTTTTTTT is a time identification, which represents time in the following format: HH: MM: SS.ss; wherein HH represents hours, MM represents minutes, SS represents seconds, and ss represents a multiple of 10 milliseconds; and XYZ is a three-bit byte coordinate identification, which represents a coordinate within the object. The method comprises calling a classification algorithm to assign a classification identification (CC), an object identification (NNNN), a direction vector (VVV) and a position XYZ to each frame; receiving the video content screens, the depth screens and the shape screens as inputs; and taking the classification identification (CC), the object identification (NNNN), the direction vector (VVV) and the position XYZ as outputs; training a function that maps the inputs to the outputs by training data samples; and storing the training data samples in the form of a database or a shape library. The shape library uses an index that contains a file set of all possible outputs of a discriminator, wherein the index is used for labeling the shape screens, and similar shape screens are classified by the same index. The present invention also provides an encoder for three-dimensional (3D) video reconstruction, comprising: an extraction module, which uses a clustering algorithm to find and extract video content frames, depth frames, and shape identification list information of an object from all content screens, shape screens, and depth screens of a complete video; a superposition module, which superposes the video content frames, the depth frames and the shape identification list information; and a shape library generation module, which combines the superposed information to compose a shape recognition list video file format so as to generate a shape library, and stores the shape library in a header of a compressed file for unmasking of an object. The present invention also provides a decoder for performing 3D video reconstruction, comprising: a read module, which reads the shape identification list in the encoder; and a copy module, which copies shapes related to the classification identification (CC), the object identification (NNNN) and the direction vector (VVV) from the shape library to the position XYZ of the shape screen; and a reconstruction module, which reconstructs the depth screens and generates the shape screens by a trained discriminator; a restoration module, which restores the complete video content according to the combination of the time identification (TTTTTTTT) and the video content frames at the specific time HH:MM:SS.ss represented by the time identification.

The present invention is intended to provide a new storage and compression format for stereoscopic video based on the 2D+Z format, which has additional auxiliary data based on shape information. The shape information improves the reconstruction quality of the video by providing additional depth continuity alignment information to the video. The present invention generates a shape library of all objects by analyzing all video content screens or video content frames, shape screens (the shape screens being generated by AI or manually provided through human intervention) and the depth screens of the entire movie. The different objects are grouped into different categories and are assigned with a category identification. The shape screens may be compressed by adding object category identification labels, object numbers, directions, time, and object position coordinates to different objects. The generated file format is called shape identification list (Shape ID listing). Since the same shape and object may appear repeatedly multiple times in different frames, the new shape recognition list format may significantly reduce the storage size and increase the compression ratio by replacing the original shape with the identifications. In addition, AI may generate certain directions of certain shapes and store them in the library. This helps to improve the rendering quality.

BRIEF DESCRIPTION OF THE DRAWINGS

In order to more clearly illustrate the technical solutions in the embodiments of the present invention, the following will brief the drawings that need to be used in the embodiments. Obviously, the drawings in the following description are only some examples of the present invention. For those of ordinary skill in the art, other drawings may be obtained based on these drawings without creative efforts.

DETAILED DESCRIPTION

Figure 1:
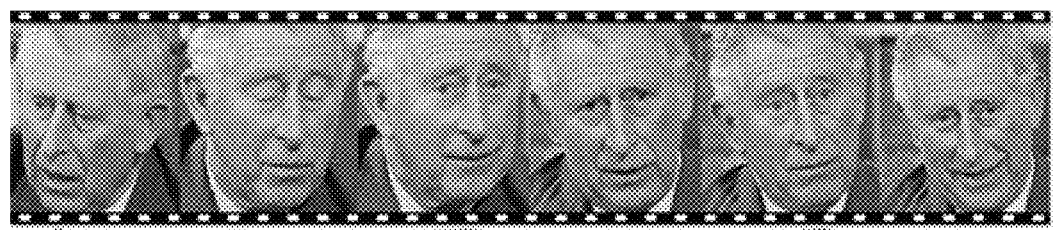
FIG. 1 is a schematic diagram showing objects with the same direction using the shape library of the present invention.
Figure 1:
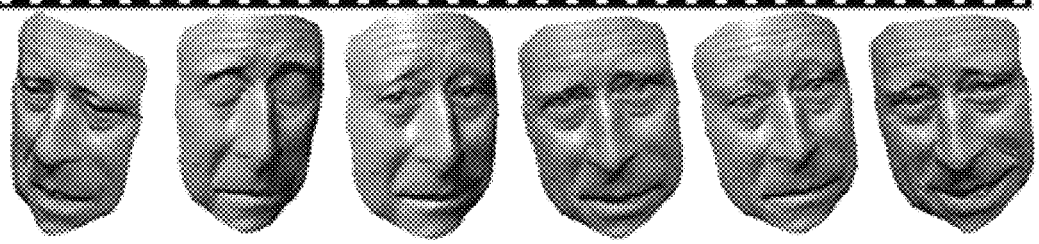

What is set forth below is what is currently considered to be the preferred embodiment or the best representative examples of the claimed invention. In careful consideration of the future and present representations or modifications to the embodiments and preferred embodiments, any changes or modifications that make substantial changes in function, purpose, structure or results are intended to be encompassed by the claims of this patent. The preferred embodiments of the present invention will now be described by way of example only with reference to the accompanying drawings.

A stereoscopic video in the 2D+Z format is composed of video content screens or video content frame sequences and depth screens. The present invention is based on the 2D+Z format. The compressed stereoscopic video comprises: a sequence of video content screens or video content frames obtained from a typical 2D+Z video, wherein the video content screens or video content frames refer to still images captured in the video at specific moments, and wherein the "video" refers to electronic media for recording, copying, replaying, broadcasting and displaying a series of still images, also called a movie, and the "still images" refer to images in a still state; a sequence of depth screens obtained from a typical 2D+Z video; and a sequence of additional shape screens provided by the present invention, wherein the shape screens may be generated by AI or manually provided by human intervention. The details of generating the shape screens will be described in detail below.

The 2D+Z format of the stereoscopic video, also known as 2D-plus-Depth format. Each 2D image frame is supplemented with a grayscale depth map, which indicates whether a specific pixel in the 2D image needs to be displayed in front of the display (white) or behind the screen plane (black). 256 grayscale levels may establish a smooth depth gradient in the image. Processing in the monitor uses this input to render the multi-view image. The video content screen and the depth screen each are information in a typical 2D+Z format video, wherein the video content screen (also known as video content frame) represents each 2D image frame; and the depth screen represents each grayscale depth map.

Different from the traditional 2D+Z format, the stereoscopic video involved in the present invention also comprises a newly added shape screen, which represents shape information of each video frame. The present invention sets up a shape identification for each shape screen, and the shape identification is represented by following 20-bit bytes:

$$CCNNNNVVVTTTTTTTTXYZ \tag{1}$$

wherein, CC represents classification identification, which is represented by two Chinese bytes, such as man (男人), puppy (小狗), table (桌子), etc., used for distinguishing one object from other objects.

NNNN is a four-byte object recognition identification, such as 0001, 0002, etc. The same object recognition identification, such as 0001, represents that both of them are the same object.

VVV is a three-byte direction vector, wherein each byte is represented by 1, 0, or −1, respectively representing the direction of the object, for example, (−1, 0, 0) representing that the object is to the left; (1, 0, 0) representing that the object is to the right; (0, −1, 0) representing that the object is downward; (0, 1, 0) representing that the object is upward; (0, 0, −1) representing that the object is backward; and (0, 0, 1) representing that the object is forward.

FIG. 1 is a schematic diagram showing objects with the same direction using the shape library of the present invention.

Among them, FIG. 1(a) is the human-face video content frames obtained by photograph taking, and FIG. 1(b) is the human-face video content frames generated by the shape recognition identifications with the same direction vector according to FIG. 1(a). The generated human-face video content frames have the same classification identification CC as in FIG. 1(a), indicating that they are both men; have different object recognition identifications, that is, have different NNNN values, indicating that they are not the same object or not the same person; have the same or substantially the same direction vector VVV, indicating that the direction of the object or person in FIG. 1(b) is consistent with that in FIG. 1(a). In the example of FIG. 1, FIG. 1(a, b) (1)-FIG. 1(a, b)(6) have direction vectors: (1) (1, −1, 1); (2) (−1, 0, 1); (3) (−1, 1, 1); (4) (0, 0, 1); (5) (0, 0, 1); and (6) (0, −1, 1), respectively.

TTTTTTTT is an octet time identification, which may represent time in the following format: HH: MM: SS.ss;

wherein HH represents hours, MM represents minutes, SS represents seconds, and ss represents a multiple of 10 milliseconds.

XYZ is a three-bit byte coordinate identification, which represents a coordinate within the object.

A typical shape recognition list video file format provided by the present invention is that: the video content frame and the depth frame are superimposed with the shape identification list; and a shape identification library is composed of a file set formed by superimposing each video content frame and depth frame with the shape identification list.

The present invention provides an encoder that uses a clustering algorithm to find and extract video content frames, depth frames, and shape identification list information from all content screens, shape screens, and depth screens of a complete video, and superpose these information to compose the shape recognition list video file format, to generate a shape library for unmasking of an object. The shape library is stored at the header of the compressed file. For a specific time: HH: MM: SS.ss, the object of the shape screen is encoded in the shape identification list format in the above expression (1) to perform the unmasking.

Clustering is an unsupervised learning process and does not require training on sample data. After designing a suitable distance measurement method, the target data set may be clustered. The goal of the above clustering algorithm is to find objects closely associated with each other and distinguish them, mainly to identify the value of the degree of association between the two objects, that is, the correlation distance measurement value. Hierarchical clustering or similar layered clustering algorithms may be selected to continuously merge two most similar groups; or K-means clustering algorithm may be selected, which randomly selects K points, obtains K categories, calculates the average of the resulting categories, to calculate the new K value, cycles the process until the same K value is found, and finally completes the clustering process. The clustering algorithm is a relatively typical example, and other clustering algorithms, such as fuzzy K-means clustering algorithm, dichotomous K-means clustering algorithm, Canopy clustering algorithm, etc., may all achieve the purpose of the present invention.

The present invention further provides an encoder and a decoder. For a specific time: HH: MM: SS.ss, the encoder is used for converting the information into a defined specific format; wherein:

Encoder

At step 101, a clustering algorithm is used for finding and extracting video content frames, depth frames, and shape identification list information from all content screens, shape screens, and depth screens of a complete video, and superpose these information to compose a shape recognition list video file format.

At step 102, a shape library is further generated from the composed shape recognition list video file for unmasking of an object. The shape library is stored at the header of the compressed file. The header also indicates the size of the composite shape library.

At step 103, based on the shape library obtained at step 102, a classification algorithm is called to assign a classification identification (CC), an object identification (NNNN), a direction vector (VVV) and a position XYZ to each frame. The classification algorithm (also referred to as "discriminator") is an AI algorithm, which receives the video content screens, depth screens and shape screens as inputs; and takes the classification identification (CC), object identification (NNNN), direction vector (VVV) and position XYZ as outputs. At step 104, a function that maps the inputs to the outputs is trained through a set of training data samples. The "trained" refers to the process of determining a function based on a series of input and output data samples. The training data samples are stored in the form of a database or a shape library.

The shape library refers to a database or a form of file structure, which uses an index that contains a file set of all possible outputs of the classification algorithm, such as classification identification (CC), object identification (NNNN), direction vector (VVV) and position XYZ, and at step 105, uses this index to label the shape screens, wherein the similar shape screens are classified under the same index. The classification algorithm includes, but is not limited to, a convolutional neural network (CNN) method, a neural network that uses a periodicity or a time recurrent neural network ("RNN").

At step 106, the following shape identification ("ID") list format is used for encoding the unmasked object of the shape screen: CCNNNNVVVTTTTTTTTXYZ. The encoding step refers to converting information into a defined specific format: CCNNNNVVVTTTTTTTTXYZ.

Decoder

Contrary to the steps of the encoder, the decoder is used for converting the specific format obtained after being encoded into the content represented by the information.

At step 201, the encoded shape identification list of a certain frame is read; at step 202, the shapes related to the above classification identification (CC), object identification (NNNN) and direction vector (VVV) are copied from the shape library to the position XYZ of the shape screen; at step 203, the depth screen is reconstructed and the shape screen is generated through the trained discriminator; at step 204, the complete video content is restored according to the combination of the time identification (TTTTTTTT) and the video content frames at the specific time HH:MM:SS.ss represented by the time identification, and the decoding steps are completed.

Figure 2:
FIG. 2 is a schematic diagram of objects with the same shape and direction generated by AI using the shape screen of the present invention.

FIG. 2 is a schematic diagram of objects with the same shape and direction generated by AI using the shape screens of the present invention.

FIGS. 2(*a*)(1)-(8) are the original 2D+Z video images, and each 2D+Z video frame and depth frame are added with a shape identification. FIGS. 2(*b*)(1)-(8) are respectively generated by AI from FIGS. 2(*a*)(1)-(8). FIG. 2(*b*)(1)-(8) correspond to the shape identification of FIG. 2(*a*)(1)-(8), both have the same classification identification CC and direction vector VVV, but may have the same or different object recognition identification NNNN. For example, FIG. 2(*a*)(1)-(8) and FIG. 2(*b*)(1)-(8) each are men, but the man in the FIG. 2(*b*)(1)-(8) generated by AI may be different from the man in FIG. 2(*a*)(1)-(8); it may also represent the same person when the object recognition identification NNNN is consistent. In the example of FIG. 2, FIG. 2(*a, b*)(1)-FIG. 2(*a, b*)(8) have direction vectors: (1) (−1, −1, 1); (2) (0, 0, 1); (3) (1, 0, 1); (4) (1, 0, 1); (5) (0, 0, 1); (6) (1, −1, 1); (7) (1, −1, 1); and (8) (1, −1, 1), respectively.

AI generation methods include, but are not limited to, traditional convolutional neural network (CNN) methods, or AI Learning 3D Face Reconstruction, or reconstruction of 3D faces in a way similar to Lego fragments. It is possible to reconstruct the 3D faces in reference to the method of direct volume regression. The coherence of the segments may be also improved by means of long and short-term memory ("LSTM") using periodic neural networks or time recurrent neural network ("RNN").

Figure 5:
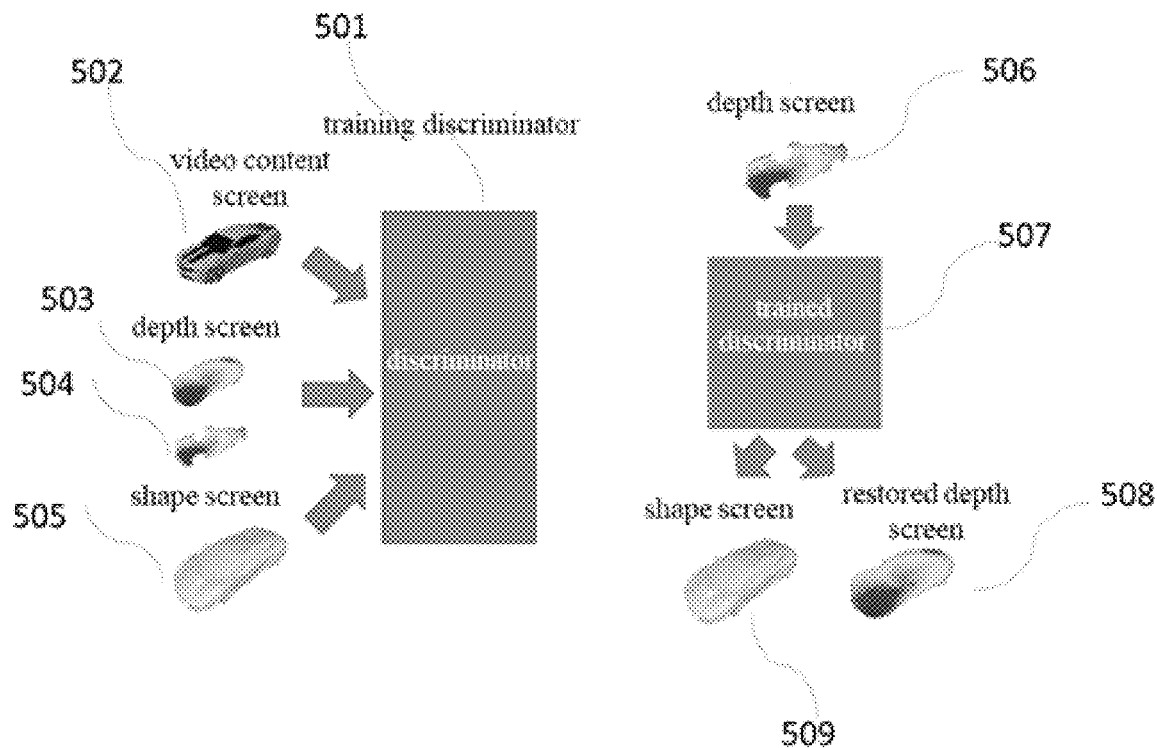
FIG. 5 schematically shows an example of classifying depth screens according to the present invention.

In another embodiment of the present invention, the objects may be classified according to the depth information of the objects in the video frame, which provides additional information and improves the quality of reconstruction. Specifically, FIG. 5 schematically shows an example of classifying the depth screens according to the present invention. The discriminator 501 is repeatedly trained by using the video content screen 502, the depth screen 503, 504 and the shape screen 505 of a specific object (i.e., classification algorithm); in the process of each repeated training, the depth screen 503 of the object may be transformed into the depth screen 504 by random distortion; for example, a part of the depth screen is randomly removed to simulate a hole on the depth screen 503. The trained discriminator 507 receives the simulated depth screen 506 (i.e., the depth screen 504) as inputs, and generates the shape screen 509 (i.e., the shape screen 505) and the reconstructed depth screen 508. The reconstructed depth screen 508 retains the information of the depth screen 503 before random distortion. In other words, the trained discriminator 507 linked to the shape library may repair the missing information to improve the quality of the depth screen.

The various component embodiments of the present invention may be implemented by hardware, or by software modules running on one or more processors, or by a combination thereof. Those skilled in the art should appreciate that a microprocessor or a digital signal processor (DSP) may be used in practice to implement the method for improving the video resolution and quality and some or all of the functions of some or all of the components of the video encoder and the decoder of the display terminal according to the embodiments of the present invention. The present invention may also be implemented as a device or device program (for example, a computer program and a computer program product) for executing part or all of the methods described herein. Such a program for implementing the present invention may be stored on a computer-readable medium, or may have the form of one or more signals. Such a signal may be downloaded from an Internet website, or provided on a carrier signal, or provided in any other forms.

Figure 3:
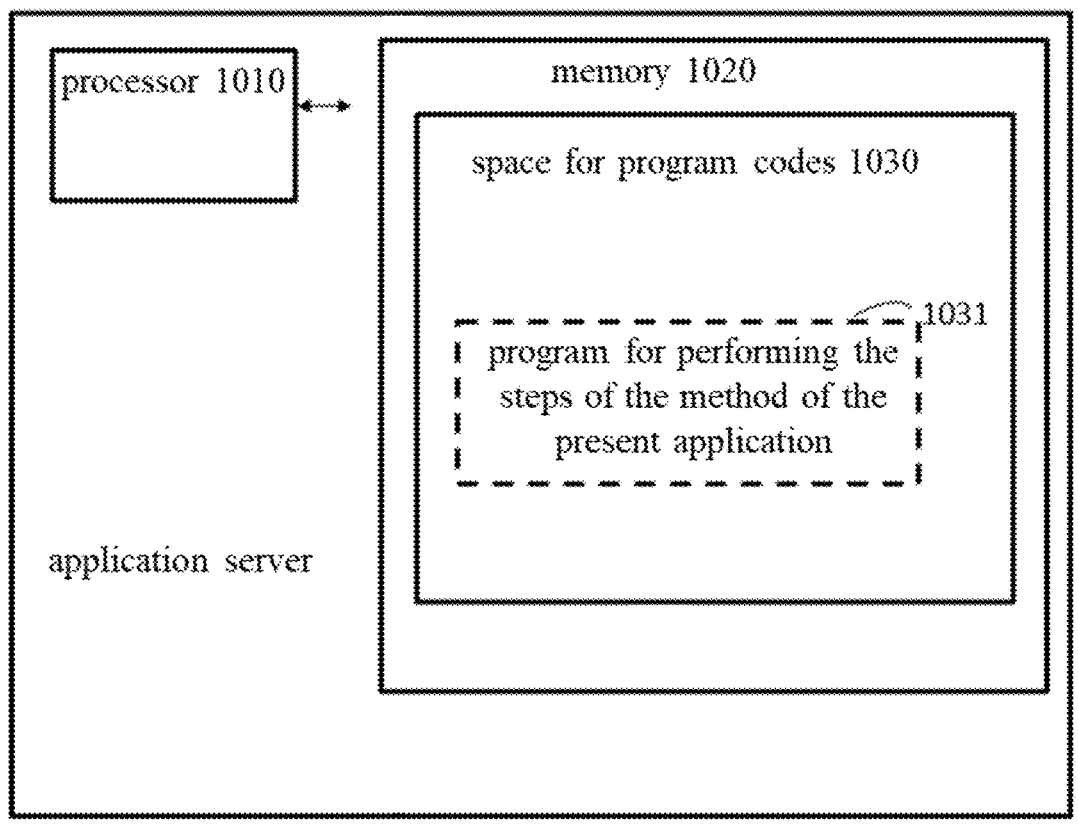
FIG. 3 schematically shows a block diagram of a server for performing the method according to the present invention.
Figure 4:
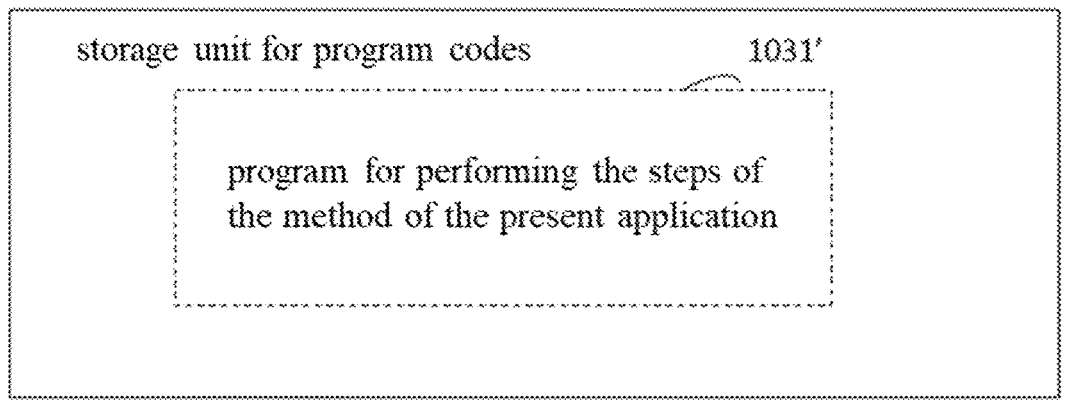
FIG. 4 schematically shows a storage unit for holding or carrying program codes for implementing the method according to the present invention.

For example, FIG. 3 shows a server, such as an application server, that may implement the present invention. The server traditionally comprises a processor 1010 and a computer program product or computer readable medium in the form of a memory 1020. The memory 1020 may be an electronic memory such as flash memory, EEPROM (Electrically Erasable Programmable Read Only Memory), EPROM, hard disk, or ROM. The memory 1020 has a storage space 1030 for the program codes 1031 for implementing any method step in the above method. For example, the storage space 1030 for the program codes may comprise various program codes 1031 respectively used for implementing various steps in the above method. These program codes may be read from or written into one or more computer program products. These computer program products comprise program code carriers such as hard disks, compact disks (CD), memory cards, or floppy disks. Such computer program products are usually portable or fixed storage units as described with reference to FIG. 4. The storage unit may have storage segments, storage spaces, etc. arranged similarly to the memory 1020 in the server of FIG. 3. The program codes may be for example compressed in an appropriate form. Generally, the storage unit comprises computer readable codes 1031', that is, codes that may be read by, for example, a processor such as 1010, which, when run by a server, cause the server to perform the steps in the method described above.

The terms "one embodiment", "an embodiment" or "one or more embodiments" referred to herein means that a specific feature, structure, or characteristic described in combination with the embodiment is included in at least one embodiment of the present invention. In addition, it should be noted that the word examples "in one embodiment" herein do not necessarily all refer to the same embodiment.

The above description is not intended to limit the meaning or scope of the words used in the following claims that define the present invention. Rather, the description and illustration are provided to help understand the various embodiments. It is expected that future changes in structure, function, or results will exist without substantial changes, and all these insubstantial changes in the claims are intended to be covered by the claims. Therefore, although the preferred embodiments of the present invention have been illustrated and described, those skilled in the art will understand that many changes and modifications may be made without departing from the claimed invention. In addition, although the term "claimed invention" or "present invention" is sometimes used herein in the singular form, it will be understood that there are multiple inventions as described and claimed.

What is claimed is:

1. A method of three-dimensional (3D) video reconstruction, comprising:
   obtaining a list of video content screens or video content frames of an object from the 3D video;
   obtaining a list of depth screens of the 3D video;
   adding a shape screen to each video frame of the 3D video;
   superimposing each of the video content screens or video content frames with the depth screen and the shape screen to form a shape identification library; and
   storing the shape identification library at a header of a compressed file for unmasking of the object.

2. The method of claim 1, wherein, the shape screen corresponds to a shape information identification, which comprises a classification identification, an object recognition identification, and a direction vector of the video content screen or the video content frame.

3. The method of claim 2, wherein, the shape information identification further comprises a time identification and a coordinate identification.

4. The method of claim 3, wherein
   the shape information identification is represented by the following 20-bit bytes:

$$\text{CCNNNNVVVTTTTTTTTXYZ} \qquad (1)$$

wherein CC represents a classification identification, which is used for distinguishing one object from other objects;
   NNNN is an object recognition identification, wherein the same object recognition identification represents that two objects are the same object;
   VVV is a direction vector, wherein each byte is represented by 1, 0, or −1, representing a direction of the object, respectively;
   TTTTTTTT is a time identification, which represents time in the following format: HH:MM:SS.ss; wherein HH represents hours, MM represents minutes, SS represents seconds, and ss represents a multiple of 10 milliseconds; and
   XYZ is a three-bit byte coordinate identification, which represents a coordinate within the object.

5. The method of claim 2, wherein,
the shape information identification is represented by the following 20-bit bytes:

CCNNNNVVVTTTTTTTTXYZ  (1)

wherein, CC represents a classification identification, which is used for distinguishing one object from other objects;
NNNN is an object recognition identification, wherein the same object recognition identification represents that two objects are the same object;
VVV is a direction vector, wherein each byte is represented by 1, 0, or −1, representing a direction of the object, respectively;
TTTTTTTT is a time identification, which represents time in the following format: HH:MM:SS.ss; wherein HH represents hours, MM represents minutes, SS represents seconds, and ss represents a multiple of 10 milliseconds; and
XYZ is a three-bit byte coordinate identification, which represents a coordinate within the object.

6. The method of claim 1, further comprising:
calling a classification algorithm to assign a classification identification (CC), an object identification (NNNN), a direction vector (VVV) and a position XYZ to each frame;
receiving the video content screens, the depth screens and the shape screens as inputs; and taking the classification identification (CC), the object identification (NNNN), the direction vector (VVV) and the position XYZ as outputs;
training a function that maps the inputs to the outputs by training data samples; and
storing the training data samples in a form of a database or a shape library.

7. The method of claim 6, wherein the shape library uses an index that contains a file set of all possible outputs of a discriminator, wherein the index is used for labeling the shape screens, and similar shape screens are classified by the same index.

8. An encoder for a three-dimensional (3D) video reconstruction, comprising:
an extractor for using a clustering algorithm to find and extract video content frames, depth frames, and shape identification list information of an object from all content screens, shape screens, and depth screens of a complete video;
a superposition device for superimposing the video content frames, the depth frames and the shape identification list information; and
a shape library generator for combining the superposed information to compose a shape recognition list video file format so as to generate a shape library, and storing the shape library in a header of a compressed file for unmasking of the object.

9. The encoder of claim 8, wherein the clustering algorithm is: a hierarchical clustering algorithm, a similar layered clustering algorithm, a fuzzy K-means clustering algorithm, a dichotomous K-means clustering algorithm or Canopy clustering algorithm.

10. The encoder of claim 8, wherein the shape identification list comprises: a classification identification, an object recognition identification and a direction vector of the video content screens or the video content frames.

11. The encoder of claim 10, wherein, the shape identification list further comprises a time identification and a coordinate identification.

12. The encoder of claim 10, wherein,
the shape information identification is represented by the following 20-bit bytes:

CCNNNNVVVTTTTTTTTXYZ  (1)

wherein, CC represents a classification identification, which is used for distinguishing one object from other objects;
NNNN is an object recognition identification, wherein the same object recognition identification represents that two objects are the same object;
VVV is a direction vector, wherein each byte is represented by 1, 0, or −1, representing a direction of the object, respectively;
TTTTTTTT is a time identification, which represents time in the following format: HH:MM:SS.ss; wherein HH represents hours, MM represents minutes, SS represents seconds, and ss represents a multiple of 10 milliseconds; and
XYZ is a three-bit byte coordinate identification, which represents a coordinate within the object.

13. The encoder of claim 12, further comprising:
a discriminator for calling a classification algorithm to assign a classification identification (CC), an object identification (NNNN), a direction vector (VVV) and a position XYZ to each frame; receiving the video content screens, the depth screens and the shape screens as inputs; and taking the classification identification (CC), the object identification (NNNN), the direction vector (VVV) and the position XYZ as outputs; and
a training device for training a function that maps the inputs to the outputs by training data samples; and storing the training data samples in the form of a database or a shape library.

14. The encoder of claim 13, wherein the shape library uses an index that contains a file set of all possible outputs of a discriminator, wherein the index is used for labeling the shape screens, and similar shape screens are classified by the same index.

15. The encoder of claim 12, wherein,
the shape information identification is represented by the following 20-bit bytes:

CCNNNNVVVTTTTTTTTXYZ  (1)

wherein CC represents a classification identification, which is used for distinguishing one object from other objects;
NNNN is an object recognition identification, wherein the same object recognition identification represents that two objects are the same object;
VVV is a direction vector, wherein each byte is represented by 1, 0, or −1, representing a direction of the object, respectively;
TTTTTTTT is a time identification, which represents time in the following format: HH:MM:SS.ss; wherein HH represents hours, MM represents minutes, SS represents seconds, and ss represents a multiple of 10 milliseconds; and
XYZ is a three-bit byte coordinate identification, which represents a coordinate within the object.

16. The encoder of claim 15, further comprising:
a discriminator for calling a classification algorithm to assign a classification identification (CC), an object identification (NNNN), a direction vector (VVV) and a position XYZ to each frame; receiving the video content screens, the depth screens and the shape screens as inputs; and taking the classification identification (CC), the object identification (NNNN), the direction vector (VVV) and the position XYZ as outputs; and a training device for training a function that maps the inputs to the outputs by training data samples; and stores the training data samples in the form of a database or a shape library.

17. The encoder of claim 16, wherein the shape library uses an index that contains a file set of all possible outputs of a discriminator, wherein the index is used for labeling the shape screens, and similar shape screens are classified by the same index.

18. A decoder for three-dimensional (3D) video reconstruction, comprising:

a reader for reading the shape identification list in the encoder of any one of claims 8-14;

a copier for copying shapes related to the classification identification (CC), the object identification (NNNN) and the direction vector (VVV) from the shape library to the position XYZ of the shape screen;

a reconstructor for reconstructing the depth screens and generates the shape screens by a trained discriminator; and a restoration device for restoring the complete video content according to the combination of the time identification (TTTTTTTT) and the video content frames at the specific time HH:MM:SS.ss represented by the time identification.

\* \* \* \* \*